(12) United States Patent
Yi et al.

(10) Patent No.: US 10,638,531 B2
(45) Date of Patent: Apr. 28, 2020

(54) METHOD FOR OPERATING A NEW ENTITY FOR LTE-WLAN AGGREGATION SYSTEM AND A DEVICE THEREFOR

(71) Applicant: LG ELECTRONICS INC., Seoul (KR)

(72) Inventors: Seungjune Yi, Seoul (KR); Sunyoung Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/039,232

(22) Filed: Jul. 18, 2018

(65) Prior Publication Data

US 2018/0343695 A1    Nov. 29, 2018

Related U.S. Application Data

(63) Continuation of application No. 15/091,498, filed on Apr. 5, 2016, now Pat. No. 10,051,679.

(Continued)

(51) Int. Cl.
*H04W 76/15* (2018.01)
*H04W 72/12* (2009.01)
(Continued)

(52) U.S. Cl.
CPC ....... *H04W 76/15* (2018.02); *H04W 72/1215* (2013.01); *H04W 76/11* (2018.02); *H04W 80/02* (2013.01); *H04W 84/042* (2013.01); *H04W 84/12* (2013.01); *H04W 88/06* (2013.01); *H04W 88/10* (2013.01)

(58) Field of Classification Search
CPC ... H04W 16/14; H04W 84/12; H04W 84/042; H04W 84/04; H04W 88/06; H04W 24/10
See application file for complete search history.

(56) References Cited

U.S. PATENT DOCUMENTS

2014/0140335 A1    5/2014  Wang et al.
2014/0177507 A1    6/2014  Hsu
(Continued)

FOREIGN PATENT DOCUMENTS

EP    3070975    9/2016
WO    2016124152    8/2016

OTHER PUBLICATIONS

European Patent Office Application Serial No. 16776799.5, Search Report dated Oct. 24, 2018, 18 pages.
(Continued)

*Primary Examiner* — Jamal Javaid
(74) *Attorney, Agent, or Firm* — Lee Hong Degerman Kang & Waimey (57) ABSTRACT

The present invention relates to a wireless communication system. More specifically, the present invention relates to a method and a device for operating a new entity for LTE-WLAN aggregation system, the method comprising: receiving, by a LTE-WLAN Aggregation Adaptation Protocol (LWAAP) entity, an LWAAP Service Data Unit (SDU) from an upper layer entity; generating, by the LWAAP entity, a LWAAP Protocol Data Unit (PDU) that includes the LWAAP SDU and an identifier identifying a radio bearer to which the upper layer entity belongs; and submitting the LWAAP PDU to a lower layer entity.

20 Claims, 10 Drawing Sheets

Related U.S. Application Data (60) Provisional application No. 62/144,349, filed on Apr. 8, 2015.

(51) Int. Cl.

| | | |
|---|---|---|
| H04W 84/04 | (2009.01) | |
| H04W 84/12 | (2009.01) | |
| H04W 80/02 | (2009.01) | |
| H04W 88/06 | (2009.01) | |
| H04W 76/11 | (2018.01) | |
| H04W 88/10 | (2009.01) | |

(56) References Cited

U.S. PATENT DOCUMENTS

| | | | |
|---|---|---|---|
| 2014/0204927 A1 | 7/2014 | Horn et al. | |
| 2014/0321376 A1* | 10/2014 | Damnjanovic | H04W 72/1215 370/329 |
| 2014/0369201 A1 | 12/2014 | Gupta et al. | |
| 2015/0350954 A1* | 12/2015 | Faccin | H04W 76/16 370/254 |
| 2016/0302077 A1 | 10/2016 | Yi et al. | |

OTHER PUBLICATIONS

3rd Generation Partnership Project (3GPP), "Technical Specification Group Radio Access Network; Evolved Universal Terrestrial Radio Access (E-UTRA); LTE-WLAN Aggregation Adaptation Protocol (LWAAP) specification (Release 13)," 3GPP TS 36.360 V13.0.0, Mar. 2016, XP051081791, 10 pages.

3rd Generation Partnership Project (3GPP), "Technical Specification Group Radio Access Network; Evolved Universal Terrestrial Radio Access (E-UTRA); LTE/WLAN Radio Level Integration Using IPsec Tunnel (LWIP) encapsulation; Protocol specification (Release 13)," 3GPP TS 36.361 V13.0.0, Mar. 2016, XP051081792, 10 pages.

LG Electronics, "Location of RB ID addition/removal in LWA", 3GPP TSG RAN WG2 Meeting #92, R2-156376, Nov. 2015, XP051042451, 2 pages.

3rd Generation Partnership Project (3GPP), "Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," 3GPP TS 36.300 V13.3.0, Mar. 2016, XP051088532, 296 pages.

Intel, et al., "New WI Proposal: LTE-WLAN Radio Level Integration and Interworking Enhancement", 3GPP TSG RAN Meeting #67, RP-150510, Mar. 2015, XP055500832, 10 pages.

United States Patent and Trademark Office U.S. Appl. No. 15/091,498, Office Action dated Nov. 16, 2017, 16 pages.

PCT International Application No. PCT/KR2016/003457, Notification of Transmittal of the International Search Report and the Written Opinion of the International Searching Authority, or Declaration dated Aug. 8, 2016, 10 pages.

\* cited by examiner

(a) Control-Plane Protocol Stack (b) User-Plane Protocol Stack

METHOD FOR OPERATING A NEW ENTITY FOR LTE-WLAN AGGREGATION SYSTEM AND A DEVICE THEREFOR

CROSS-REFERENCE TO RELATED APPLICATIONS

This application is a continuation of U.S. patent application Ser. No. 15/091,498, filed on Apr. 5, 2016, currently pending, which claims the benefit of U.S. Provisional Patent Application No. 62/144,349, filed on Apr. 8, 2015, the contents of which are all hereby incorporated by reference herein in their entirety.

BACKGROUND OF THE INVENTION

Field of the Invention

The present invention relates to a wireless communication system and, more particularly, to a method for operating a new entity for LTE-WLAN aggregation system and a device therefor.

Discussion of the Related Art

As an example of a mobile communication system to which the present invention is applicable, a 3rd Generation Partnership Project Long Term Evolution (hereinafter, referred to as LTE) communication system is described in brief.

Figure 1:
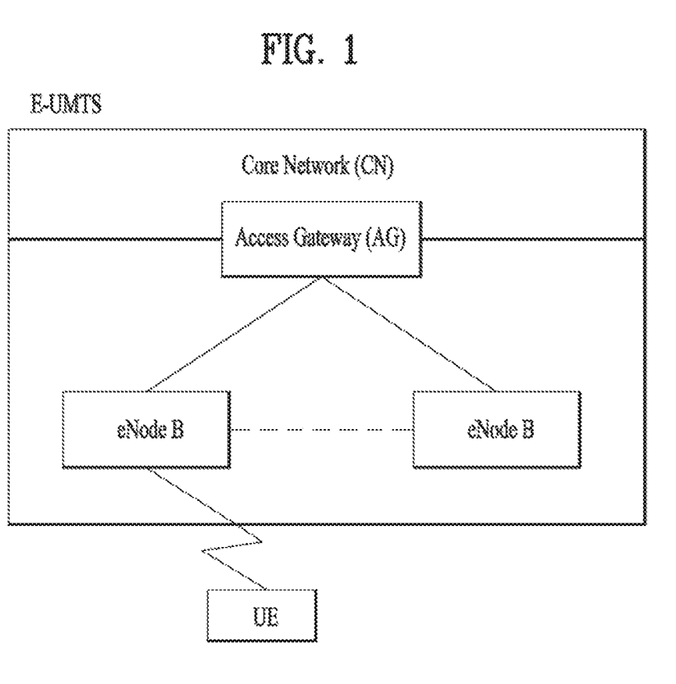
FIG. 1 is a diagram showing a network structure of an Evolved Universal Mobile Telecommunications System (E-UMTS) as an example of a wireless communication system.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARD)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Meanwhile, various wireless communication technologies systems have been developed with rapid development of information communication technologies. WLAN technology from among wireless communication technologies allows wireless Internet access at home or in enterprises or at a specific service provision region using mobile terminals, such as a Personal Digital Assistant (PDA), a laptop computer, a Portable Multimedia Player (PMP), etc. on the basis of Radio Frequency (RF) technology.

A standard for a wireless LAN technology is developing as IEEE (Institute of Electrical and Electronics Engineers) 802.11 standard. IEEE 802.11a and b use an unlicensed band on 2.4 GHz or 5 GHz. IEEE 802.11b provides transmission speed of 11 Mbps and IEEE 802.11a provides transmission speed of 54 Mbps. IEEE 802.11g provides transmission speed of 54 Mbps in a manner of applying an OFDM (orthogonal frequency-division multiplexing) scheme on 2.4 GHz. IEEE 802.11n provides transmission speed of 300 Mbps to 4 spatial streams in a manner of applying a MIMO-OFDM (multiple input multiple output-OFDM) scheme. IEEE 802.11n supports a channel bandwidth as wide as 40 MHz. In this case, it is able to provide transmission speed of 600 Mbps.

The aforementioned wireless LAN standard has been continuously enhanced and standardization of IEEE 802.11ax, which is appearing after IEEE 802.11ac standard supporting maximum 1 Gbps by using maximum 160 MHz channel bandwidth and supporting 8 spatial streams, is under discussion.

Recently, a radio technology has been developed in two types in response to the rapid increase of traffic. Firstly, speed of the radio technology itself is getting faster. A mobile phone wireless internet technology has been developed from HSPA to LTE and LTE to LTE-A. Currently, the mobile phone wireless internet technology becomes fast as fast as maximum 225 Mbps and a Wi-Fi technology becomes fast as fast as maximum 6.7 Gbps in case of IEEE 802.11 ad. Secondly, speed can be increased using a scheme of aggregating a plurality of radio channels with each other. For example, there exists LTE-A which supports carrier aggregation corresponding to a technology of binding frequency bands using an identical radio technology into one. In this context, necessity for a technology of aggregating heterogeneous wireless internet is emerging. It is necessary to develop a scheme of transmitting data by biding radio technologies (e.g., LTE and wireless-LAN) including characteristics different from each other.

SUMMARY OF THE INVENTION

The object of the present invention can be achieved by providing a method for User Equipment (UE) operating in a wireless communication system as set forth in the appended claims.

In another aspect of the present invention, provided herein is a communication apparatus as set forth in the appended claims.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

DETAILED DESCRIPTION OF THE INVENTION

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 2A:
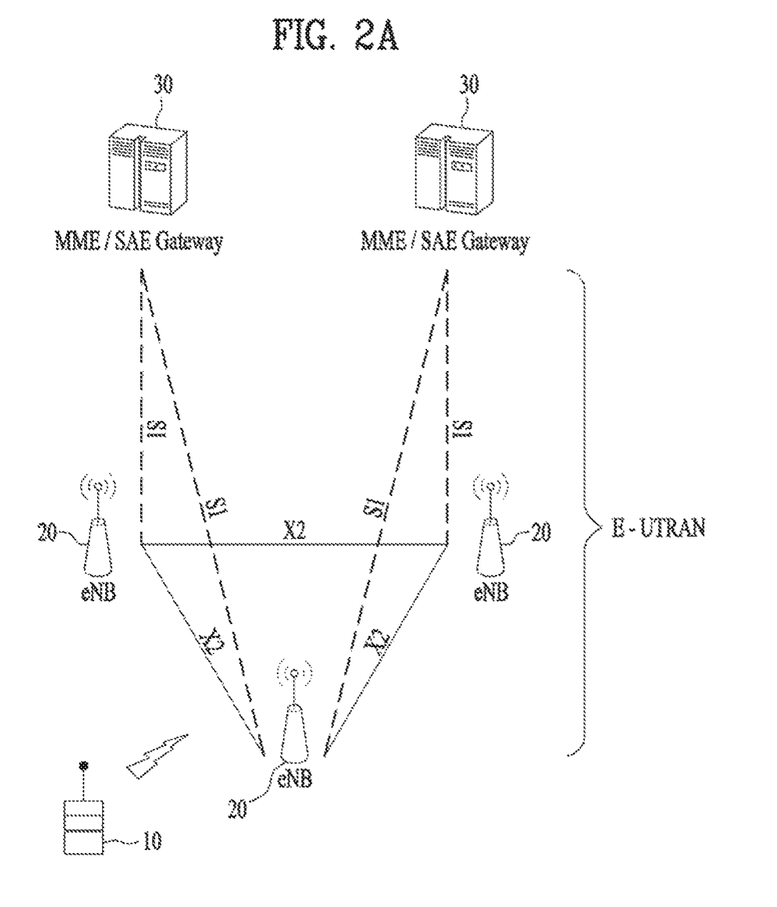
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
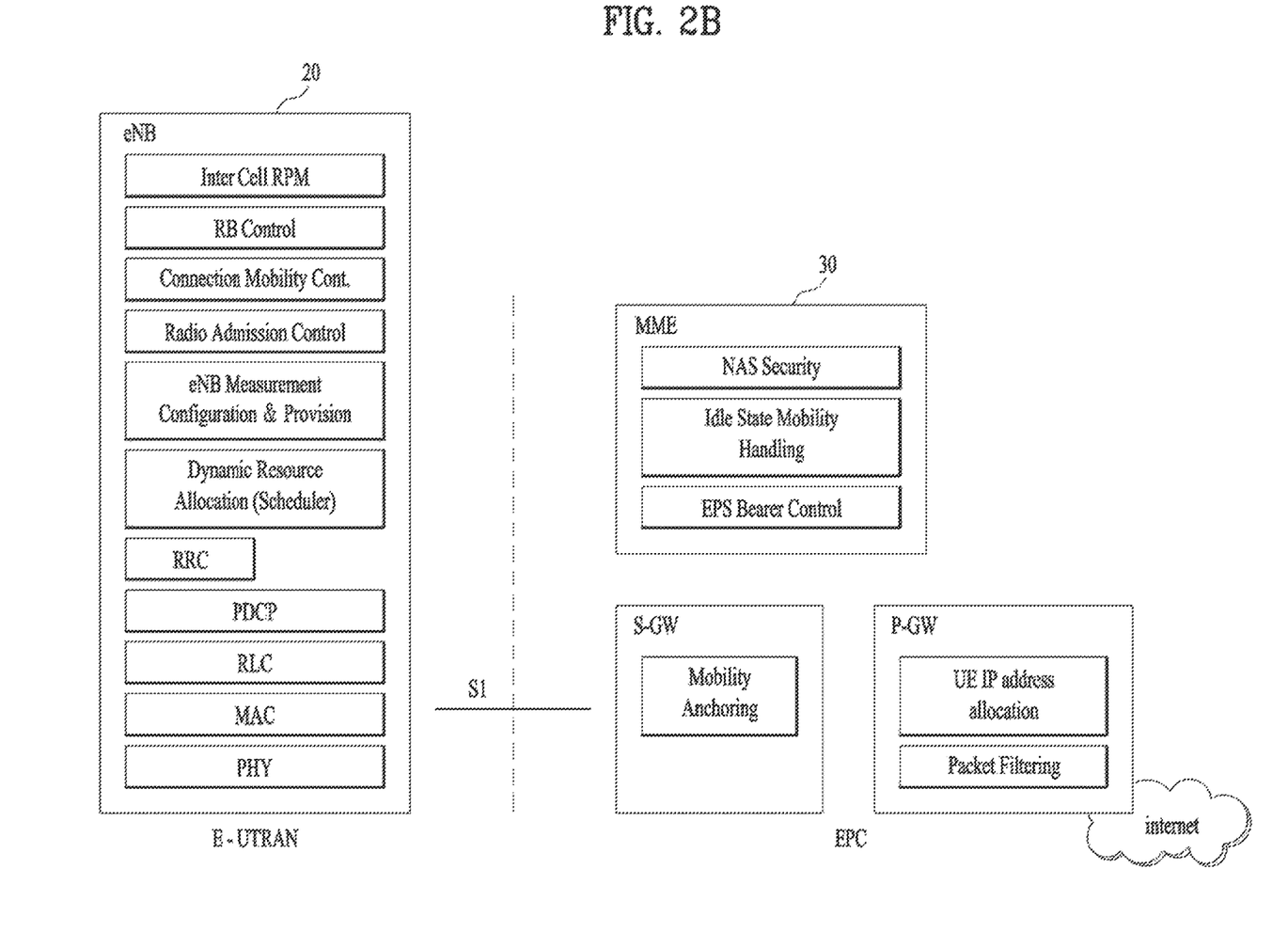
FIG. 2B is a block diagram depicting architecture of a typical E-UTRAN and a typical EPC.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
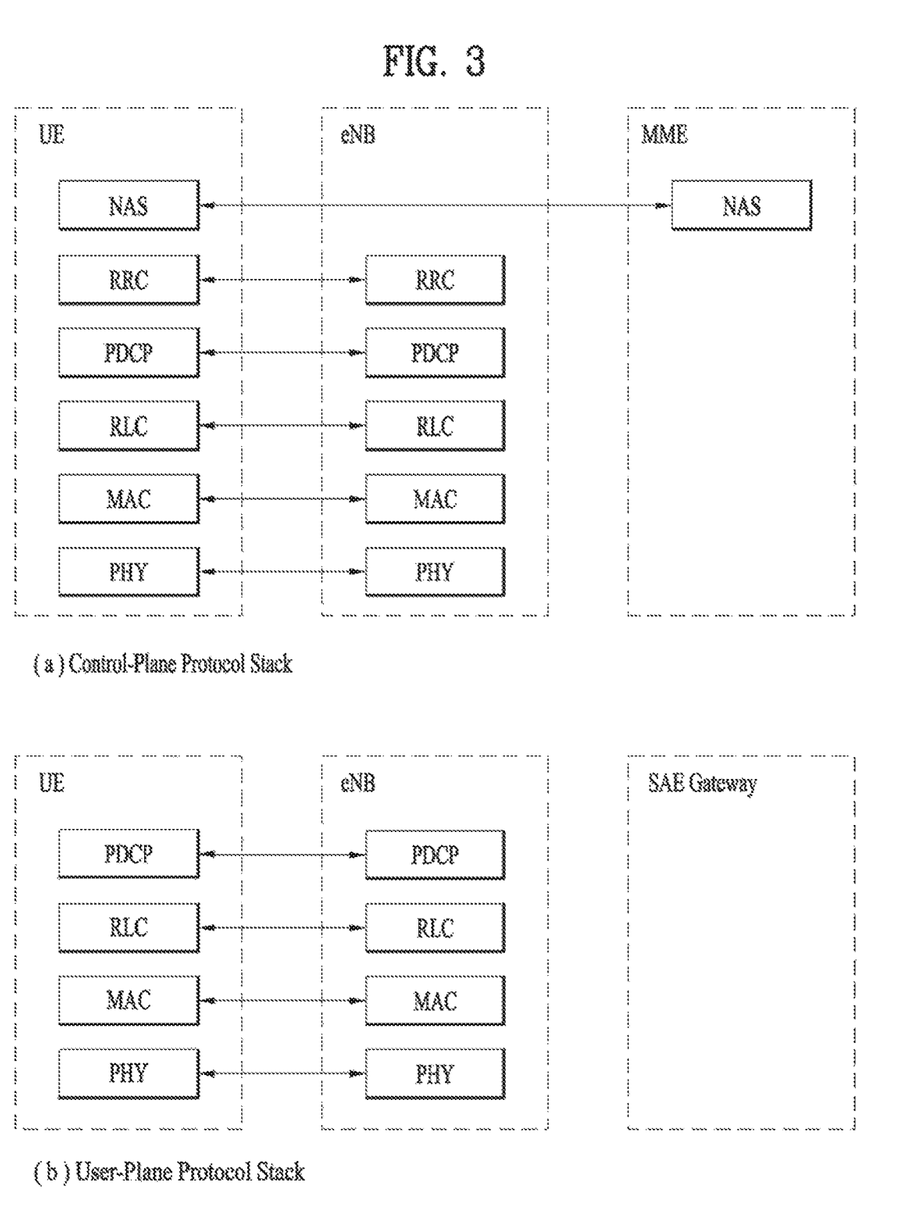
FIG. 3 is a diagram showing a control plane and a user plane of a radio interface protocol between a UE and an E-UTRAN based on a 3rd generation partnership project (3GPP) radio access network standard.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
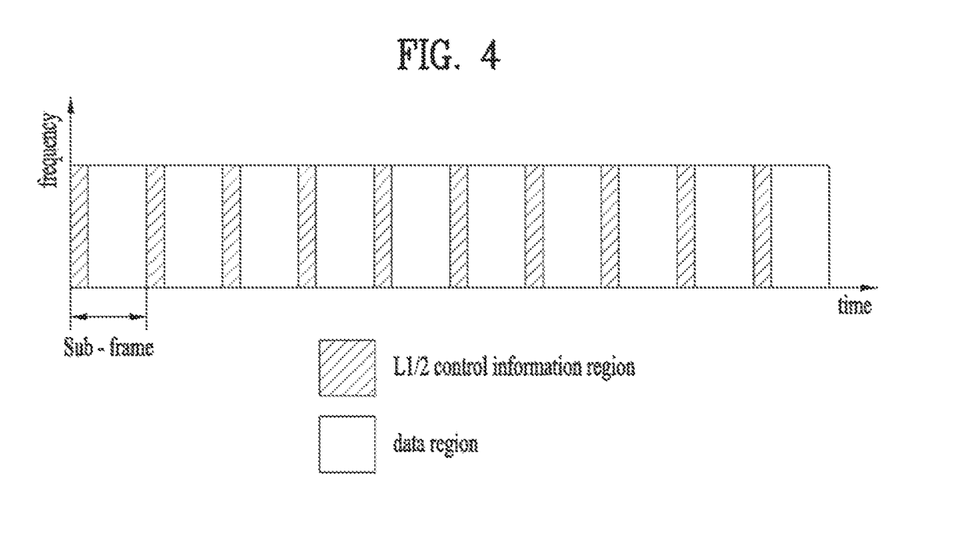
FIG. 4 is a diagram of an example physical channel structure used in an E-UMTS system.

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 5:
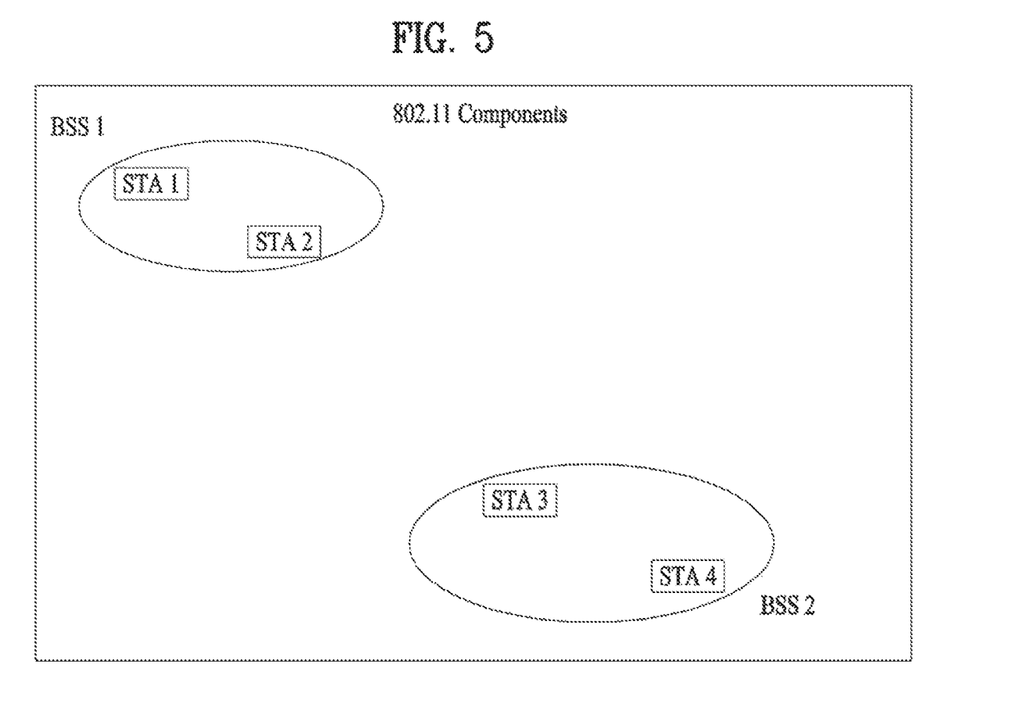
FIGS. 5 to 7 illustrate are exemplary configuration of an IEEE 802.11 system to which the present invention is applicable.

FIG. 5 illustrates an exemplary configuration of an IEEE 802.11 system to which the present invention is applicable.

The IEEE 802.11 architecture may include a plurality of components. A WLAN that supports Station (STA) mobility transparent to upper layers may be provided through interaction between the components. A Basic Service Set (BSS) is a basic building block of an IEEE 802.11 LAN. FIG. 5 illustrates two BSSs, BSS1 and BSS2, each with two STAs that are members of the BSS (STA1 and STA2 are included in BSS1 and STA3 and STA4 are included in BSS2). Each of the BSSs covers an area in which the STAs of the BSS maintain communication, as indicated by an oval. This area may be referred to as a Basic Service Area (BSA). As an STA moves out of its BSA, it can no longer communicate directly with other members of the BSA.

An Independent Basic Service Set (IBSS) is the most basic type of BSS in the IEEE 802.11 LAN. For example, a minimum IBSS includes only two STAs. A BSS, BSS1 or BSS2 which is the most basic type without other components in FIG. 1 may be taken as a major example of the IBSS. This configuration may be realized when STAs communicate directly. Because this type of LAN is often formed without pre-planning for only as long as the LAN is needed, it is often referred to as an ad hoc network.

The membership of an STA in a BSS may be dynamically changed when the STA is powered on or off or the STA moves into or out of the coverage area of the BSS. To be a member of the BSS, an STA may join the BSS by synchronization. To access all services of a BSS infrastructure, the STA should be associated with the BSS. This association may be dynamically performed and may involve use of a Distributed System Service (DSS).

Figure 6:
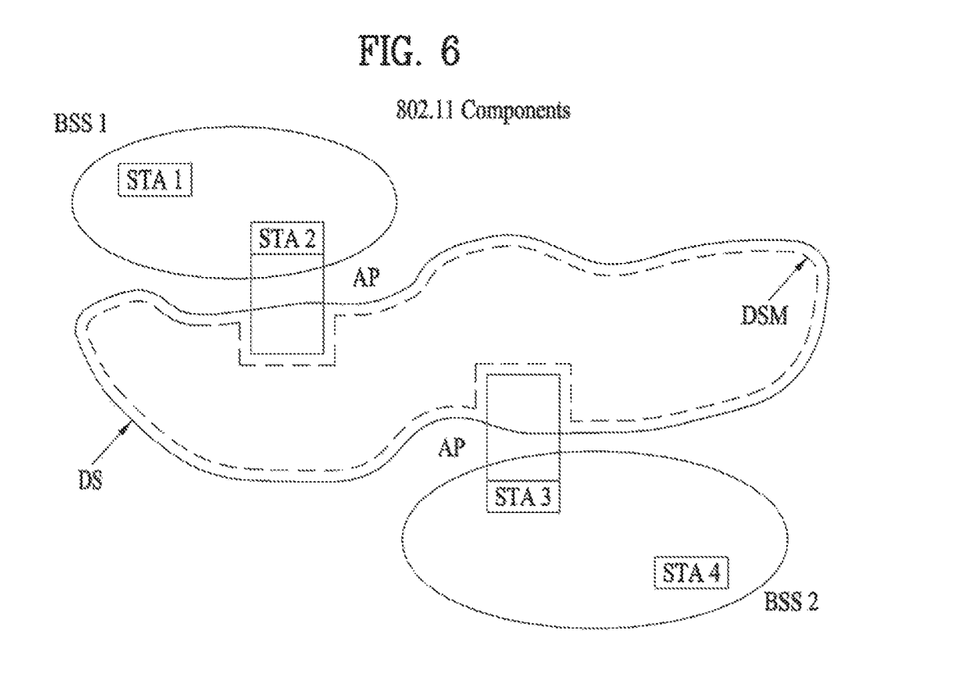

FIG. 6 illustrates another exemplary configuration of the IEEE 802.11 system to which the present invention is applicable. In FIG. 6, components such as a Distribution System (DS), a Distribution System Medium (DSM), and an Access Point (AP) are added to the architecture illustrated in FIG. 5.

Physical (PHY) performance may limit direct STA-to-STA distances. While this distance limitation is sufficient in some cases, communication between STAs apart from each other by a long distance may be required. To support extended coverage, a DS may be deployed.

A DS is built from multiple BSSs that are interconnected. Specifically, a BSS may exist as a component of an extended network with a plurality of BSSs, rather than it exists independently as illustrated in FIG. 5.

The DS is a logical concept and may be specified by the characteristics of a DSM. In this regard, the IEEE 802.11 standard logically distinguishes a Wireless Medium (WM) from a DSM. Each logical medium is used for a different purpose by a different component. The IEEE 802.11 standard does not define that these media should be the same or different. The flexibility of the IEEE 802.11 LAN architecture (DS structure or other network structures) may be explained in the sense that a plurality of media are logically different. That is, the IEEE 802.11 LAN architecture may be built in various manners and may be specified independently of the physical characteristics of each implementation example.

The DS may support mobile devices by providing services needed to handle address to destination mapping and seamless integration of multiple BSSs.

An AP is an entity that enables its associated STAs to access a DS through a WM and that has STA functionality. Data may move between the BSS and the DS through the AP. For example, STA2 and STA3 illustrated in FIG. 2 have STA functionality and provide a function of enabling associated STAs (STA1 and STA4) to access the DS. Since all APs are basically STAs, they are addressable entities. An address used by an AP for communication on the WM is not necessarily identical to an address used by the AP for communication on the DSM.

Data that one of STAs associated with the AP transmits to an STA address of the AP may always be received at an uncontrolled port and processed by an IEEE 802.1X port access entity. If a controlled port is authenticated, transmission data (or frames) may be transmitted to the DS.

Figure 7:
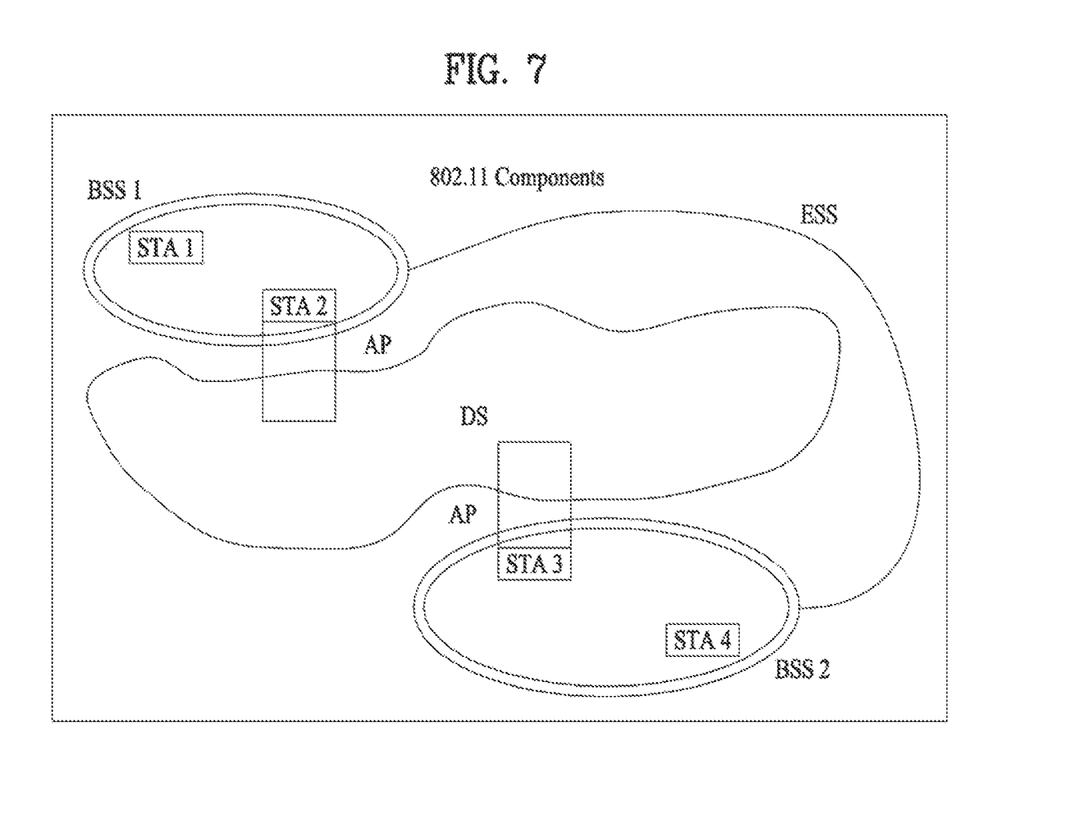

FIG. 7 illustrates another exemplary configuration of the IEEE 802.11 system to which the present invention is applicable. In addition to the architecture illustrated in FIG. 6, FIG. 7 conceptually illustrates an Extended Service Set (ESS) to provide extended coverage.

A DS and BSSs allow IEEE 802.11 to create a wireless network of arbitrary size and complexity. IEEE 802.11 refers to this type of network as an ESS network. An ESS may be a set of BSSs connected to a single DS. However, the ESS does not the DS. The ESS network appears as an IBSS network to a Logical Link Control (LLC) layer. STAs within an ESS may communicate with each other and mobile STAs may move from one BSS to another (within the same ESS) transparently to the LLC layer.

IEEE 802.11 assumes nothing about the relative physical locations of the BSSs in FIG. 7. All of the followings are possible. The BSSs may partially overlap. This is commonly used to arrange contiguous coverage. The BSSs may be physically disjointed. Logically, there is no limit to the distance between BSSs. The BSSs may be physically co-located. This may be done to provide redundancy. One (or more) IBSS or ESS networks may be physically present in the same space as one (or more) ESS networks. This may arise when an ad hoc network is operating at a location that also has an ESS network, when physically overlapping IEEE 802.11 networks have been set up by different organizations, or when two or more different access and security policies are needed at the same location.

Figure 8:
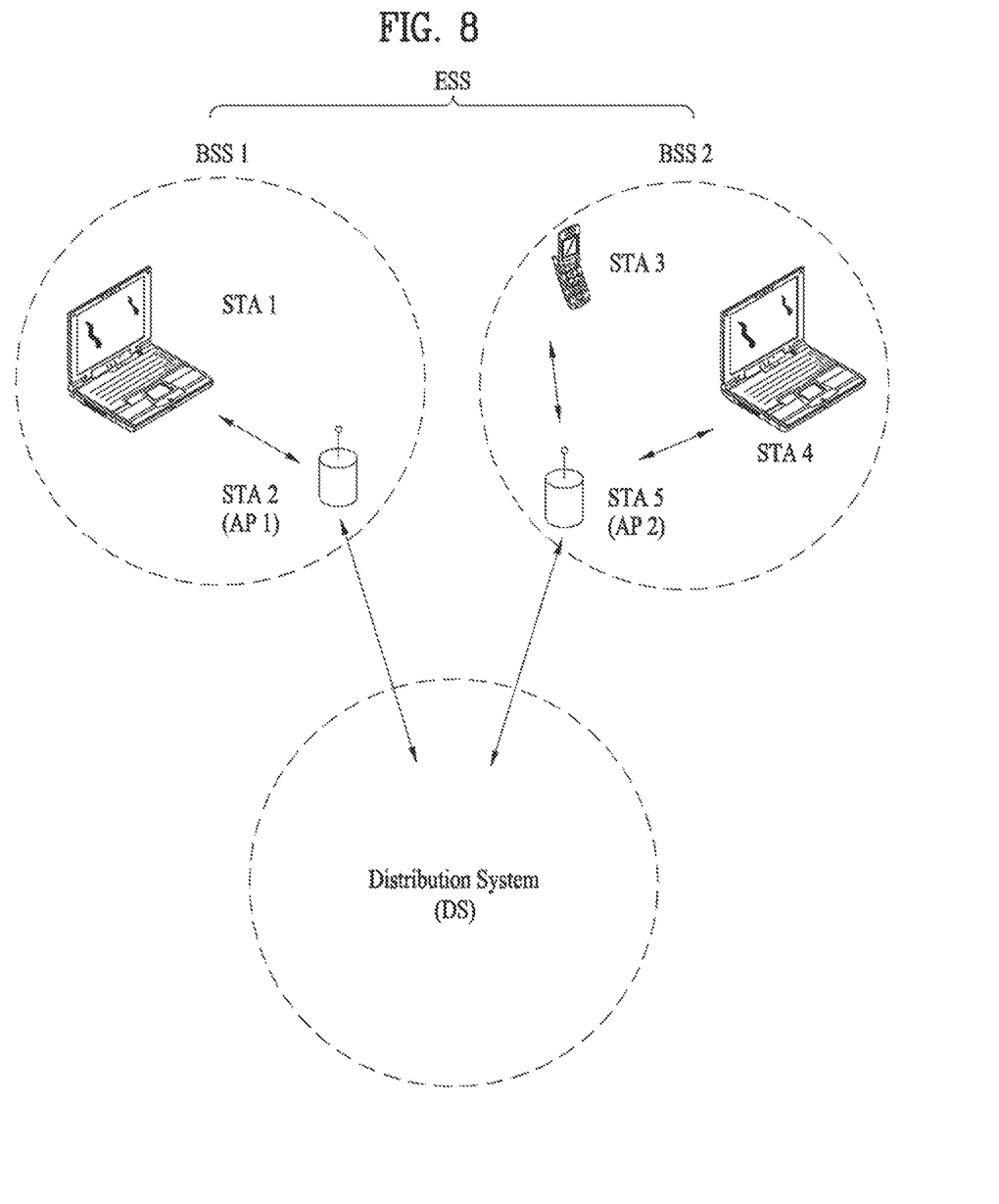
FIG. 8 illustrates an exemplary configuration of a WLAN system.

FIG. 8 illustrates an exemplary configuration of a WLAN system. In FIG. 8, an exemplary infrastructure BSS including a DS is illustrated.

In the example of FIG. 8, an ESS includes BSS1 and BSS2. In the WLAN system, an STA is a device complying with Medium Access Control/Physical (MAC/PHY) regulations of IEEE 802.11. STAs are categorized into AP STAs and non-AP STAs. The non-AP STAs are devices handled directly by users, such as laptop computers and mobile phones. In FIG. 8, STA1, STA3, and STA4 are non-AP STAs, whereas STA2 and STA5 are AP STAs.

Figure 9:
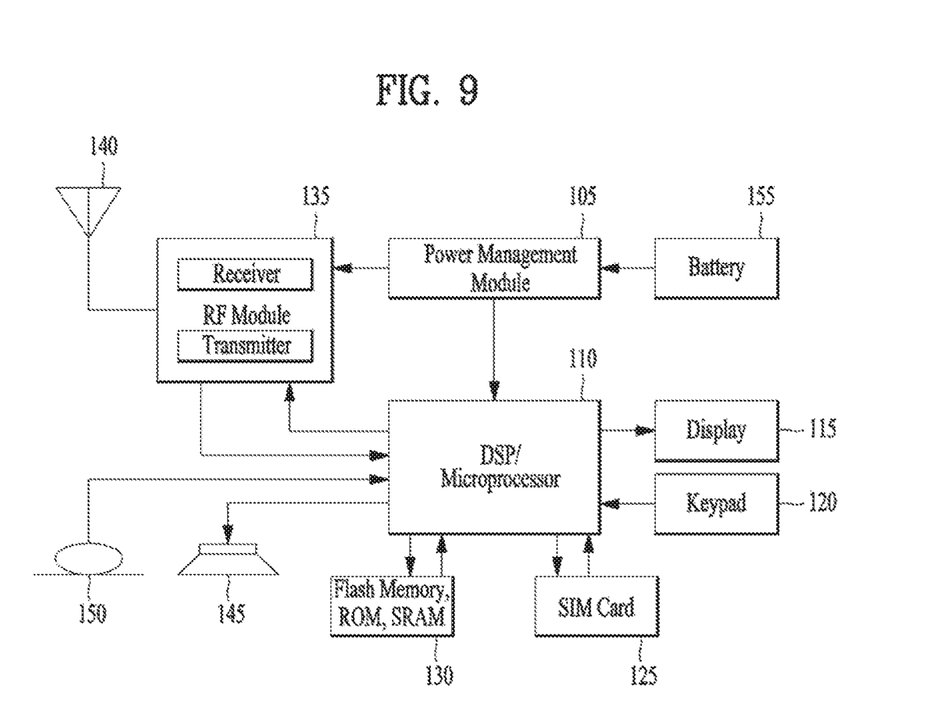
FIG. 9 is a block diagram of a communication apparatus according to an embodiment of the present invention.

In the following description, a non-AP STA may be referred to as a terminal, a Wireless Transmit/Receive Unit (WTRU), a User Equipment (UE), a Mobile Station (MS), a Mobile Terminal (MT), or a Mobile Subscriber Station (MSS). An AP corresponds to a Base Station (BS), a Node B, an evolved Node B (eNB), a Base Transceiver System (BTS), or a femto BS in other wireless communication fields. FIG. 9 is a block diagram of a communication apparatus according to an embodiment of the present invention.

The apparatus shown in FIG. 9 can be a user equipment (UE) and/or eNB adapted to perform the above mechanism, but it can be any apparatus for performing the same operation.

As shown in FIG. 9, the apparatus may comprises a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 9 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 9 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

Figure 10:
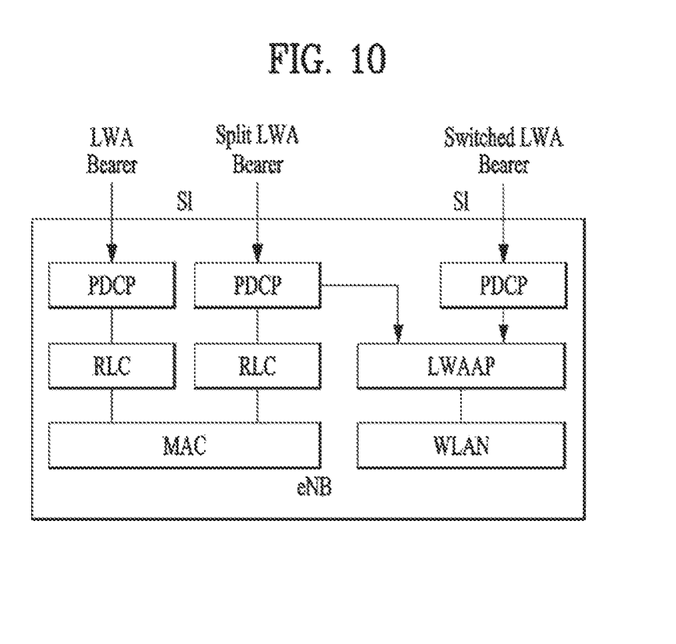
FIGS. 10 to 11 are diagrams for a LTE-WLAN aggregation (LWA) Radio Protocol Architecture according to embodiments of the present invention.

FIG. 10 is a diagram for a LTE-WLAN aggregation (LWA) Radio Protocol Architecture according to embodiments of the present invention.

E-UTRAN supports LTE-WLAN aggregation (LWA) operation whereby a UE in RRC_CONNECTED is configured by the eNB to utilize radio resources of LTE and WLAN. Two scenarios are supported depending on the backhaul connection between LTE and WLAN: i) non-collocated LWA scenario for a non-ideal backhaul and, ii) collocated LWA scenario for an ideal/internal backhaul.

In LWA, the radio protocol architecture that a particular bearer uses depends on the LWA backhaul scenario and how the bearer is set up. Split LWA bearer is depicted on FIG. 10.

For the LTE-WLAN radio level integration, similar architecture as dual connectivity (DC) can be used. The only change is to replace SeNB by WLAN except that RLC layer is not available in WLAN protocol. However, as most of the RLC functions (e.g. segmentation and reassembly, retransmission, etc.) are performed in WLAN MAC layer, direct mapping between PDCP and WLAN MAC can be considered.

However, simple replacement does not work because WLAN protocol is different from LTE protocol, in that: i) WLAN MAC entity does not guarantee error-free transmission. After maximum number of retransmission, the WLAN MAC entity gives up the transmission, which leads to packet loss, and ii) WLAN MAC entity does not support identification of PDCP/RLC entities. In LTE, the identification is provided by LCID in MAC header. Moreover, the WLAN MAC entity cannot look into the MAC SDU as it is ciphered bit-string.

To support radio level LTE-WLAN integration, the followings are invented. To support error-free transmission, an AM RLC entity is used between PDCP entity and WLAN MAC entity. This AM RLC is called as "WLAN-RLC" entity. And to identify PDCP/RLC entity, an L2 identification entity is used between RLC and WLAN MAC. This L2 identification entity is called as "LWAAP (LTE-WLAN Aggregation Adaptation Protocol)" entity.

Functions of the LWAAP sublayer are performed by LWAAP entities. For an LWAAP entity configured at the eNB, there is a peer LWAAP entity configured at the UE and vice versa. For all LWA bearers, there is one LWAAP entity in the eNB and one LWAAP entity in the UE.

The LWA bearer comprises a PDCP entity, an RLC entity, an MAC entity, an LWAAP entity and an wireless LAN entity. The LWAAP entity is located between PDCP entity and wireless-LAN entity. The LWAAP entity is associated with one or more upper entities, wherein each of the one or more upper entities belongs to a respective radio bearer.

An LWAAP entity receives/delivers LWAAP SDUs from/to upper layer (i.e. PDCP) and sends/receives LWAAP PDUs to/from its peer LWAAP entity via WLAN.

And the LWAAP entity attaches the identifier of PDCP entity to PDCP PDU (=LWAAP SDU), and detaches the identifier of PDCP entity from a MAC SDU (=LWAAP PDU).

For example, at the eNB, when an LWAAP entity receives an LWAAP SDU from a PDCP entity, the LWAAP entity generates a LWAAP PDU including the LWAAP SDU and an identifier identifying a radio bearer to which the PDCP entity belongs, and delivers the corresponding LWAAP PDU to a wireless LAN entity.

At the UE, when an LWAAP entity receives an LWAAP PDU including the identifier identifying a radio bearer to which a PDCP entity belongs from the wireless LAN entity, the LWAAP entity reassembles the corresponding LWAAP SDU and delivers it to the PDCP entity.

When the LWAAP entity reassembles the corresponding LWAAP SDU, the LWAAP entity identifying the PDCP entity to which the LWAAP PDU should be delivered based on the identifier in the LWAAP PDU, and generates a LWAAP SDU by without including a LWAAP header from the LWAAP PDU.

Preferably, the LWAAP entity uniquely identifies a PDCP entity. The length of the identifier is 1 byte.

Preferably, the identifier is included in the LWAAP header.

Preferably, the LWAAP PDU is a LWAAP data PDU.

Figure 11:
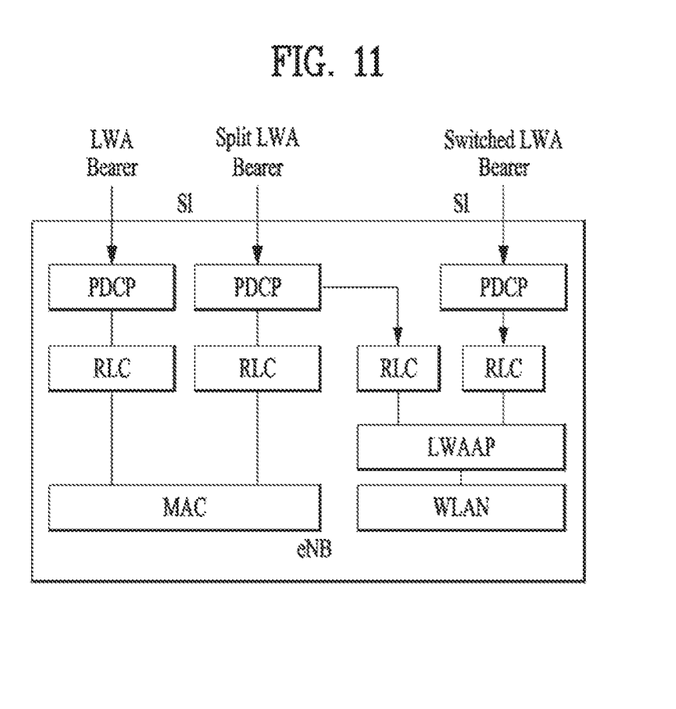

FIG. 11 is another diagram for a LWA Radio Protocol Architecture according to embodiments of the present invention.

In this case, a WLAN-RLC entity is configured per radio bearer. The LWA bearer comprises a PDCP entity, an RLC entity, an MAC entity, a wireless LAN-RLC entity, an LWAAP entity and an wireless LAN entity. The LWAAP entity is located between wireless LAN-RLC entity and wireless-LAN entity. Multiple WLAN-RLC entities are mapped to the LWAAP entity.

The WLAN-RLC entity performs segmentation/concatenation of RLC SDUs (i.e. PDCP PDUs) to generate fixed size of RLC PDUs. The fixed size is configured when the WLAN RLC entity is established.

The WLAN-RLC entity supports AM RLC functions, i.e. retransmission, status reporting, polling, segmentation/concatenation and reassembly, resegmentation, etc.

The WLAN-RLC entity is used if error-free transmission needs to be guaranteed in WLAN side. If error is allowed, WLAN-RLC entity is not used, and PDCP entity and LWAAP entity is directly linked.

And the LWAAP entity attaches the identifier of WLAN-RLC entity to RLC PDU (=LWAAP SDU), and detaches the identifier of WLAN-RLC entity from a MAC SDU (=LWAAP PDU).

If an WLAN-RLC entity is used, at the eNB, when an LWAAP entity receives an LWAAP SDU from an WLAN-RLC entity, the LWAAP entity generates a LWAAP PDU including the LWAAP SDU and an identifier identifying a radio bearer to which the WLAN-RLC entity belongs, and delivers the corresponding LWAAP PDU to a wireless LAN entity.

At the UE, when an LWAAP entity receives an LWAAP PDU including the identifier identifying a radio bearer to which an WLAN-RLC entity belongs from the wireless LAN layer, the LWAAP entity reassembles the corresponding LWAAP SDU and delivers it to the WLAN-RLC entity.

When the LWAAP entity reassembles the corresponding LWAAP SDU, the LWAAP entity identifying the WLAN-RLC entity to which the LWAAP PDU should be delivered based on the identifier in the LWAAP PDU, and generates a LWAAP SDU by without including a LWAAP header from the LWAAP PDU.

A function of the LWAAP entity can be included in the WLAN-RLC entity. In this case, separate LWAAP entity is not needed. The modified WLAN-RLC entity performs RLC functions as well as LWAAP's attach/detach functions.

Preferably, the LWAAP entity uniquely identifies an WLAN-RLC entity. The length of the identifier is 1 byte.

Preferably, the identifier is included in the LWAAP header.

Preferably, the LWAAP PDU is a LWAAP data PDU.

Figure 12:
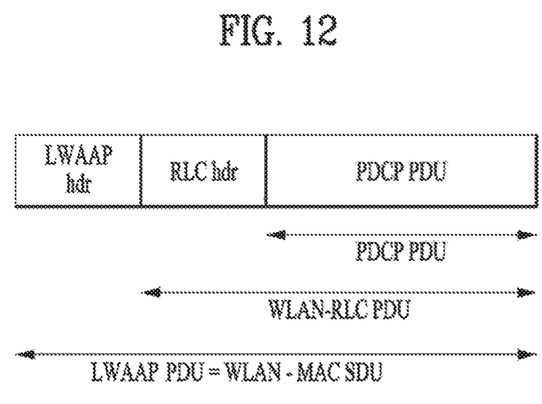
FIG. 12 is an example diagram for LWAAP PDU according to embodiments of the present invention.

FIG. 12 is an example diagram for LWAAP PDU according to embodiments of the present invention. The identifier is included in the LWAAP header.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from essential characteristics of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

What is claimed is:

1. A method for a transmitter operating in a wireless communication system, the method comprising:
generating, by a Long Term Evolution (LTE)-Wireless Local Area Network (WLAN) Aggregation Adaptation Protocol (LWAAP) entity, a Protocol Data Unit (PDU) including a Service Data Unit (SDU) and an identity of a radio bearer among a plurality of radio bearers,
wherein the SDU related with the radio bearer is received from an upper layer entity of the transmitter; and
delivering, by the LWAAP entity, the PDU to a lower layer entity of the transmitter,
wherein the radio bearer is related with the upper layer entity and the upper layer entity is directly linked to the LWAPP entity for a first network and a Radio Link Control (RLC) entity for a second network,
wherein the plurality of radio bearers are related with the LWAAP entity.

2. The method according to claim 1,
wherein the upper layer entity is a Packet Data Convergence Protocol (PDCP) entity.

3. The method according to claim 1, wherein the lower layer entity is a WLAN Medium Access Control (MAC) entity.

4. The method according to claim 1, wherein the first network is a WLAN network and the second network is an LTE network.

5. The method according to claim 1, wherein the first network and the second network are different types of networks.

6. A method for a receiver operating in a wireless communication system, the method comprising:
receiving, by a Long Term Evolution (LTE)-Wireless Local Area Network (WLAN) Aggregation Adaptation Protocol (LWAAP) entity from a lower layer entity of the receiver, a Protocol Data Unit (PDU) including an identity of a radio bearer among a plurality of radio bearers;
identifying, by the LWAAP entity, an upper layer entity to which the PDU should be delivered based on the identity included in a header of the PDU;
obtaining, by the LWAAP entity, a Service Data Unit (SDU) by removing the header from the PDU; and
delivering, by the LWAAP entity, the SDU to the upper layer entity identified by the identity of the radio bearer,
wherein the radio bearer is related with the upper layer entity and the upper layer entity is directly link to the LWAAP entity for a first network and a Radio Link Control (RLC) entity for a second network,
wherein the plurality of radio bearers are related with the LWAAP entity.

7. The method according to claim 6,
wherein the upper layer entity is a Packet Data Convergence Protocol (PDCP) entity.

8. The method according to claim 6, wherein the lower layer entity is a WLAN Medium Access Control (MAC) entity.

9. The method according to claim 6, wherein the first network is a WLAN network and the second network is an LTE network.

10. The method according to claim 6, wherein the first network and the second network are different types of networks.

11. A Base Station (BS) operating in a wireless communication system, the BS comprising:

a transceiver; and a processor configured to:

generate, by a Long Term Evolution (LTE)-Wireless Local Area Network (WLAN) Aggregation Adaptation Protocol (LWAAP) entity, a Protocol Data Unit (PDU) including a Service Data Unit (SDU) and an identity of a radio bearer among a plurality of radio bearers, wherein the SDU related with the radio bearer is received from an upper layer entity of the BS; and deliver, by the LWAAP entity, the PDU to a lower layer entity of the BS, wherein the radio bearer is related with the upper layer entity and the upper layer is directly link to the LWAAP entity for a first network and a Radio Link Control (RLC) entity for a second network, wherein the plurality of radio bearers are related with the LWAAP entity.

12. The BS according to 11, wherein the upper layer entity is a Packet Data Convergence Protocol (PDCP) entity.

13. The BS according to claim 11, wherein the lower layer entity is a WLAN Medium Access Control (MAC) entity.

14. The BS according to claim 11, wherein the first network is a WLAN network and the second network is an LTE network.

15. The BS according to claim 11, wherein the first network and the second network are different types of networks.

16. A User Equipment (UE) operating in a wireless communication system, the UE comprising:

a transceiver; and a processor configured to:

control the transceiver to receive, by a Long Term Evolution (LTE)-Wireless Local Area Network (WLAN) Aggregation Adaptation Protocol (LWAAP) entity from a lower layer entity of the UE, a Protocol Data Unit (PDU) including an identity of a radio bearer among a plurality of radio bearers;

identify, by the LWAAP entity, an upper layer entity to which the PDU should be delivered based on the identity included in a header of the PDU;

obtain, by the LWAAP entity, a Service Data Unit (SDU) by removing the header from the PDU; and deliver, by the LWAAP entity, the SDU to the upper layer entity identified by the identity of the radio bearer, wherein the radio bearer is related with the upper layer entity and the upper layer is directly linked to the LWAAP entity for a first network and a Radio Link Control (RLC) entity for a second network, wherein the plurality of radio bearers are related with the LWAAP entity.

17. The UE according to 16, wherein the upper layer entity is a Packet Data Convergence Protocol (PDCP) entity.

18. The UE according to claim 16, wherein the lower layer entity is a WLAN Medium Access Control (MAC) entity.

19. The UE according to claim 16, wherein the first network is a WLAN network and the second network is an LTE network.

20. The UE according to claim 16, wherein the first network and the second network are different types of networks.

* * * * *